(12) United States Patent
Matsushita

(10) Patent No.: US 9,580,953 B1
(45) Date of Patent: Feb. 28, 2017

(54) PULLEY JOINT ASSEMBLY

(71) Applicant: Hi-Lex Controls, Inc., Rochester Hills, MI (US)

(72) Inventor: Masayuki Matsushita, Rochester Hills, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 0 days.

(21) Appl. No.: 15/133,591

(22) Filed: Apr. 20, 2016

Related U.S. Application Data

(60) Provisional application No. 62/290,733, filed on Feb. 3, 2016.

(51) Int. Cl.
*E05F 15/689* (2015.01)
*B60J 1/08* (2006.01)

(52) U.S. Cl.
CPC .............. *E05F 15/689* (2015.01); *B60J 1/08* (2013.01); *E05Y 2201/434* (2013.01); *E05Y 2201/654* (2013.01); *E05Y 2900/55* (2013.01)

(58) Field of Classification Search
CPC ...... E05F 15/689; B60J 1/08; E05Y 2201/654
USPC .......................................................... 49/352
See application file for complete search history.

(56) References Cited

U.S. PATENT DOCUMENTS

| | | | |
|---|---|---|---|
| 4,034,616 A * | 7/1977 | Rauscher | F16H 55/48 474/174 |
| 4,428,542 A | 1/1984 | Kobayashi et al. | |
| 5,469,663 A | 11/1995 | TenBrink et al. | |
| 5,809,695 A | 9/1998 | Strickland | |
| 5,890,321 A * | 4/1999 | Staser | B60J 5/0416 49/352 |
| 6,227,993 B1 * | 5/2001 | Medebach | E05F 11/382 474/144 |
| 7,121,044 B2 * | 10/2006 | Santaolalla | E05F 11/486 49/352 |
| 7,882,658 B2 | 2/2011 | Staser | |
| 7,950,185 B2 | 5/2011 | Lefevre et al. | |
| 9,476,496 B2 * | 10/2016 | Fukumoto | F16H 55/36 |
| 2006/0037247 A1 * | 2/2006 | Heyer | E05F 11/483 49/352 |
| 2007/0163178 A1 | 7/2007 | Lefevre et al. | |
| 2007/0199246 A1 | 8/2007 | Renke et al. | |
| 2007/0251149 A1 | 11/2007 | Kirejczyk et al. | |
| 2008/0127563 A1 * | 6/2008 | Tooker | E05F 11/535 49/349 |
| 2009/0051193 A1 | 2/2009 | Hernandez et al. | |

(Continued)

FOREIGN PATENT DOCUMENTS

FR   GB 2388158 A * 11/2003 ............ E05F 11/483
WO   WO 2008/112750 A1   9/2008

(Continued)

*Primary Examiner* — Jerry Redman
(74) *Attorney, Agent, or Firm* — Brinks Gilson & Lione

(57) ABSTRACT

A window regulator assembly particularly adapted for motor vehicle applications having a pulley assembly featuring snap in insulation of a pulley ring into a pulley housing. The pulley housing features the clearance area and a number of retention tabs and hooks which enable the pulley ring to be snap fit into position. The assembly may be implemented with a discrete window regulator or as part of a modular inner door plate as well as and for other applications.

10 Claims, 8 Drawing Sheets

(56) References Cited

U.S. PATENT DOCUMENTS

| | | | | |
|---|---|---|---|---|
| 2009/0188167 | A1* | 7/2009 | Maruyama | E05F 11/483 49/347 |
| 2010/0119295 | A1* | 5/2010 | Renke | E05F 11/483 403/14 |
| 2011/0111900 | A1* | 5/2011 | Wilson | F16C 13/006 474/166 |
| 2015/0191957 | A1* | 7/2015 | Takeda | E05F 11/483 49/352 |
| 2015/0275560 | A1* | 10/2015 | Yamamoto | E05F 11/488 49/352 |

FOREIGN PATENT DOCUMENTS

| | | | | |
|---|---|---|---|---|
| WO | WO 2008112750 A1 * | 9/2008 | | B60J 5/0416 |
| WO | WO 2009/141401 A1 | 11/2009 | | |

* cited by examiner

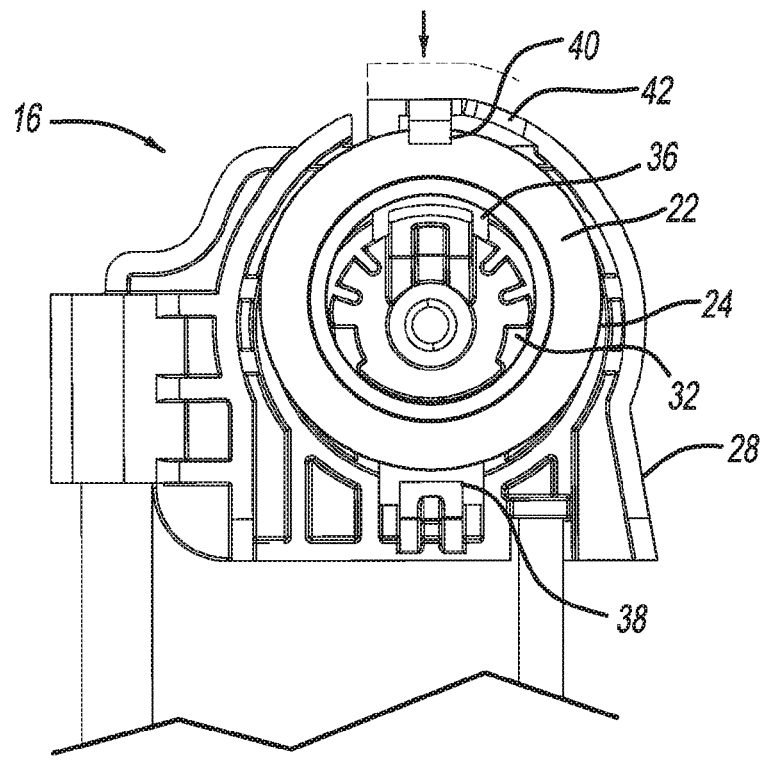
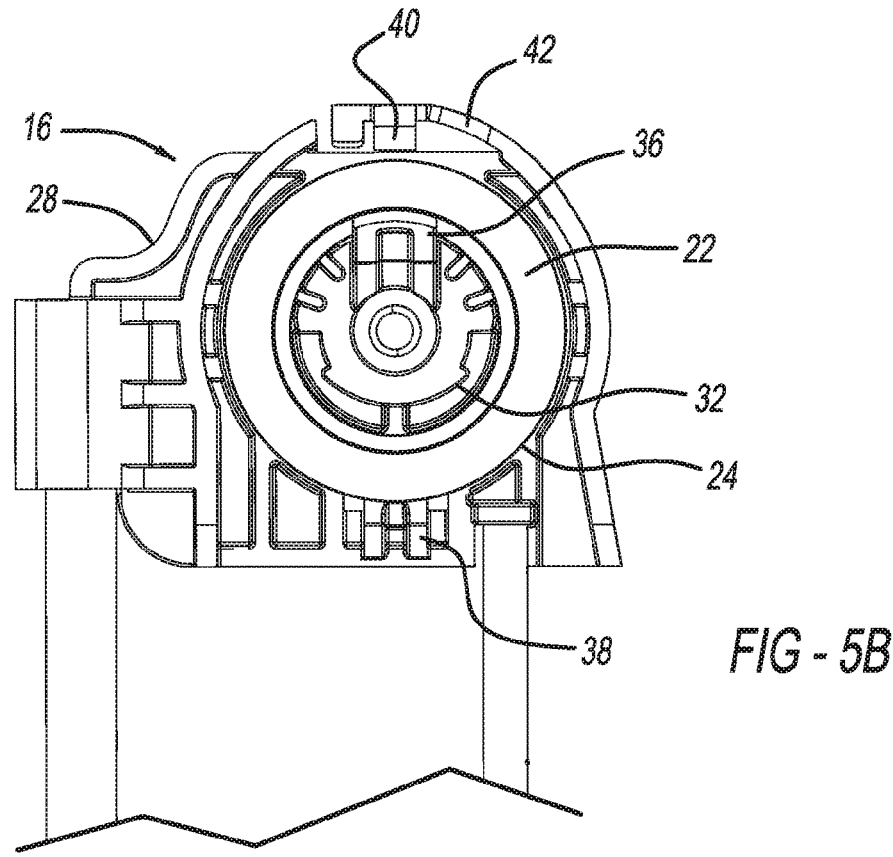

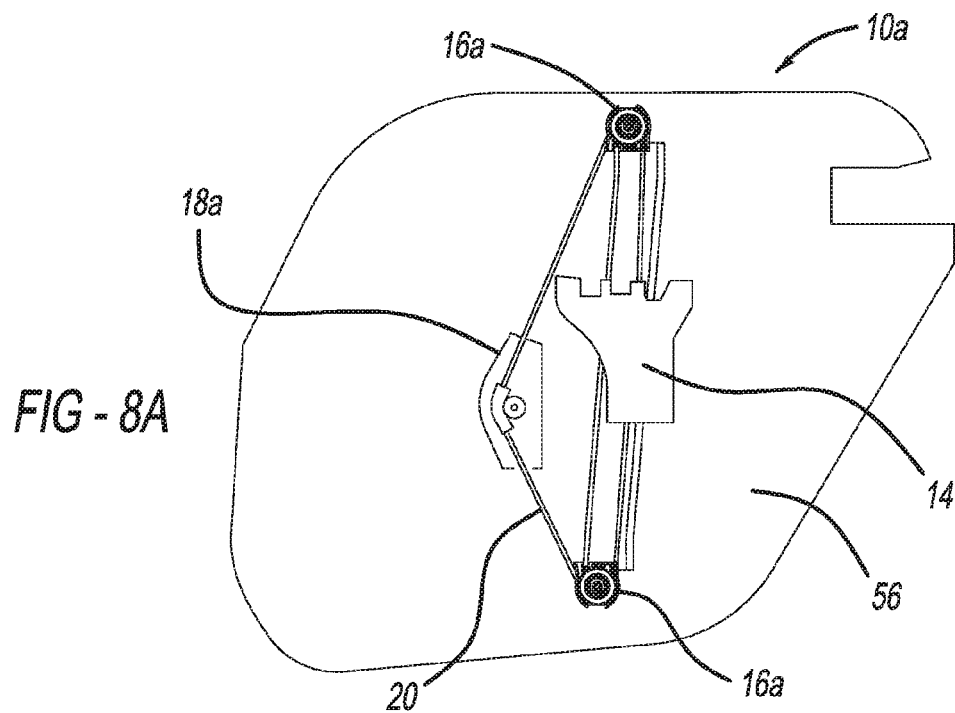
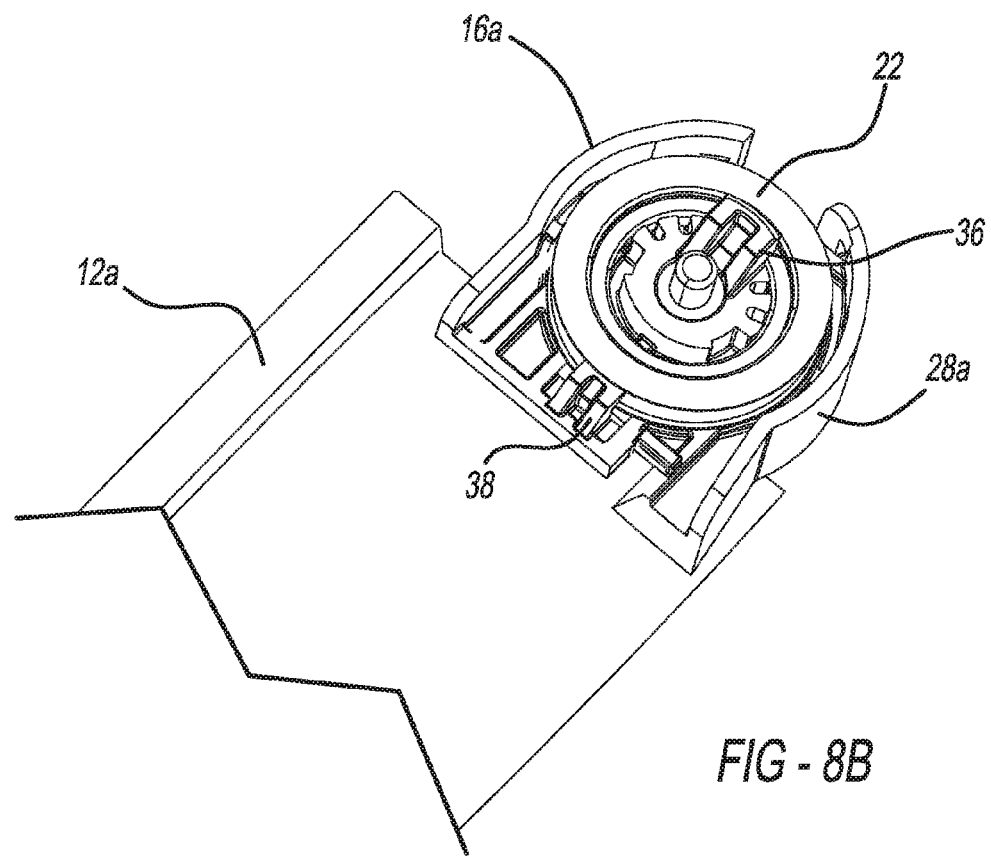

PULLEY JOINT ASSEMBLY

CROSS REFERENCE TO RELATED APPLICATIONS

This application claims priority to U.S. Provisional Application No. 62/290,733, filed on, filed on Feb. 3, 2016.

FIELD OF THE INVENTION

This invention relates to a pulley joint assembly potentially suited for various applications but in a preferred implementation is utilized in an automotive window regulator assembly.

BACKGROUND

Passenger car and a light truck motor vehicles feature movable side door glass. A mechanism is required to move the glass between the upper closed position and the lower opened position. These mechanisms are generally known as window regulators. Window regulators can be manually operated, or can be driven by a power actuator, most commonly employing an electric motor. One type of window regulator uses a pulley arrangement having a metal cable wrapped around a drum driven by an electric motor. These devices use a carrier movable along a guide rail which engages the door glass which is a driven by the metal cable to control its motion.

The pulley components provided for cable driven window regulator systems are available in numerous configurations. A typical arrangement is to provide a stud or shaft which acts as a bearing journal for supporting and permitting rotation of the pulley. The drive cable is wrapped around the outer perimeter of the pulley wheel. These devices work well and are implemented in a wide range of machines, articles and mechanisms. Despite the satisfactory performance of conventional pulley arrangements, there is constantly a desire to reduced cost, simplify assembly, and reduce weight of automotive components, while providing a desirable durability, low warranty claims, and compliance with performance requirements. This invention is related to a pulley joint assembly which addresses the above-referenced desirable attributes.

SUMMARY

The pulley joint assembly in accordance with the present invention utilizes a simple pulley arrangement which is snap-fit into a pulley housing. The joint assembly includes features for maintaining the pulley in an assembled condition while providing required performance attributes. The described arrangement may be implemented with a conventional guide rail type window regulator, or in an alternative implementation, can be integrated into a door module structure. Moreover other applications of the described pulley joint assembly in various structures and machines are available.

BRIEF DESCRIPTION OF THE DRAWINGS

FIGS. 5A and 5B illustrate the completed assembly condition of the pulley joint assembly;

FIG. 8A is a side view of a module plate incorporating the pulley joint assembly of the present invention, and FIG. 8B is an enlargement from FIG. 8A.

DETAILED DESCRIPTION

Figure 1:
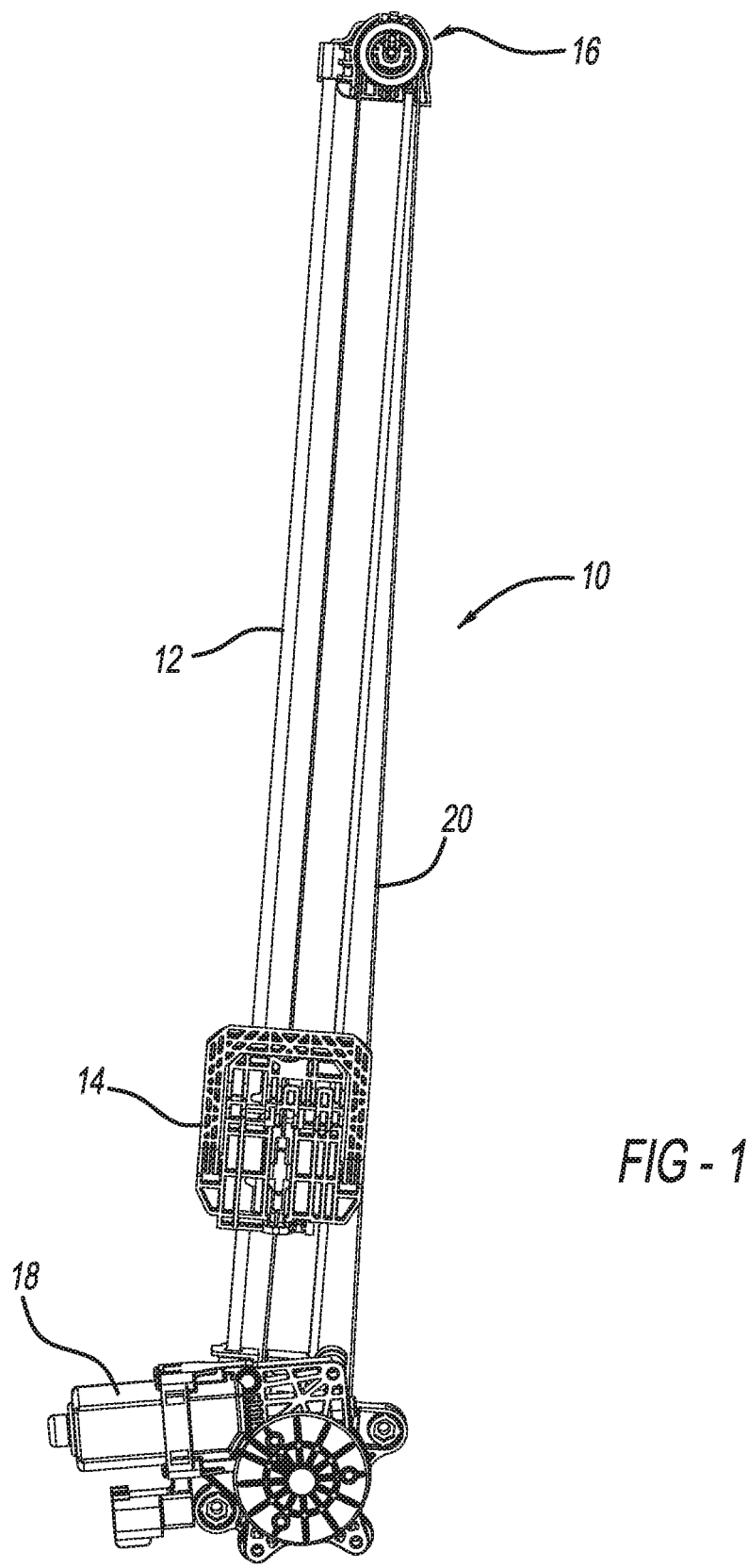
FIG. 1 is a side view of a window regulator assembly incorporating a pulley joint assembly in accordance with the present invention.

With reference to FIG. 1 window regulator assembly 10 is illustrated, which includes as principal components, guide rail 12, window carrier 14, pulley assembly 16, motor drive assembly 18, and drive cable 20. Guide rail 12 is typically made from sheet-metal stock fabricated by a stamping or rolling process, or as an extrusion. Window carrier 14 is caused to travel up and down along guide rail 12 and includes a window clamp arrangement which attaches to the lower edge of the vehicle side door glass (not illustrated). Pulley assembly 16 is positioned at the top of guide rail 12 and acts to redirect and tension drive cable 20. Motor drive assembly 16 is powered electrically and includes internal reduction gears and a cable drum to move drive cable 18. Drive cable 20 wraps around pulley assembly 16 at the top of the assembly and wraps around the drive pulley which is part of motor drive assembly 18. Ends of drive cable 20 terminate at window carrier 14.

Motor drive assembly 18 is shown in FIG. 1 affixed to the bottom of guide rail 12 but could be positioned at other locations depending on application requirements. Similarly, pulley assembly 16 is shown at the top of guide rail 12 but may be implemented in various other positions depending on the application. Window regulator assembly 10 is shown as a single rail type system. Alternate implementations may use a pair of separated guide rails provided for control of the movable glass or other panel, based on application requirements.

This invention is particularly related to the design configuration of pulley assembly 16. As noted previously, such a pulley arrangement may be found in numerous automotive and other vehicle applications and other mechanisms and devices. Although this description treats pulley assembly 16 as part of window regulator assembly 10, the pulley assembly may be implemented in such alternative applications. For example pulley assembly 16 is described as usable for controlling the motion of side door glass, but could be readily implemented for other motor vehicle movable panels including closure panels.

With particular reference to FIGS. 2A, 2B, 3A and 3B, features of components of pulley assembly 16 are illustrated. Pulley ring 22 is hoop shaped with an outer external grooved perimeter 24 for receiving and guiding drive cable 20. Inside cylindrical bearing surface 26 is provided for allowing rotation of pulley ring 22, as will be described in further detail. Between perimeter 24 and bearing surface 26 is a reduced thickness circular central hub portion 25. Pulley ring 22 is preferably formed of a polymeric resin material.

Figure 2:
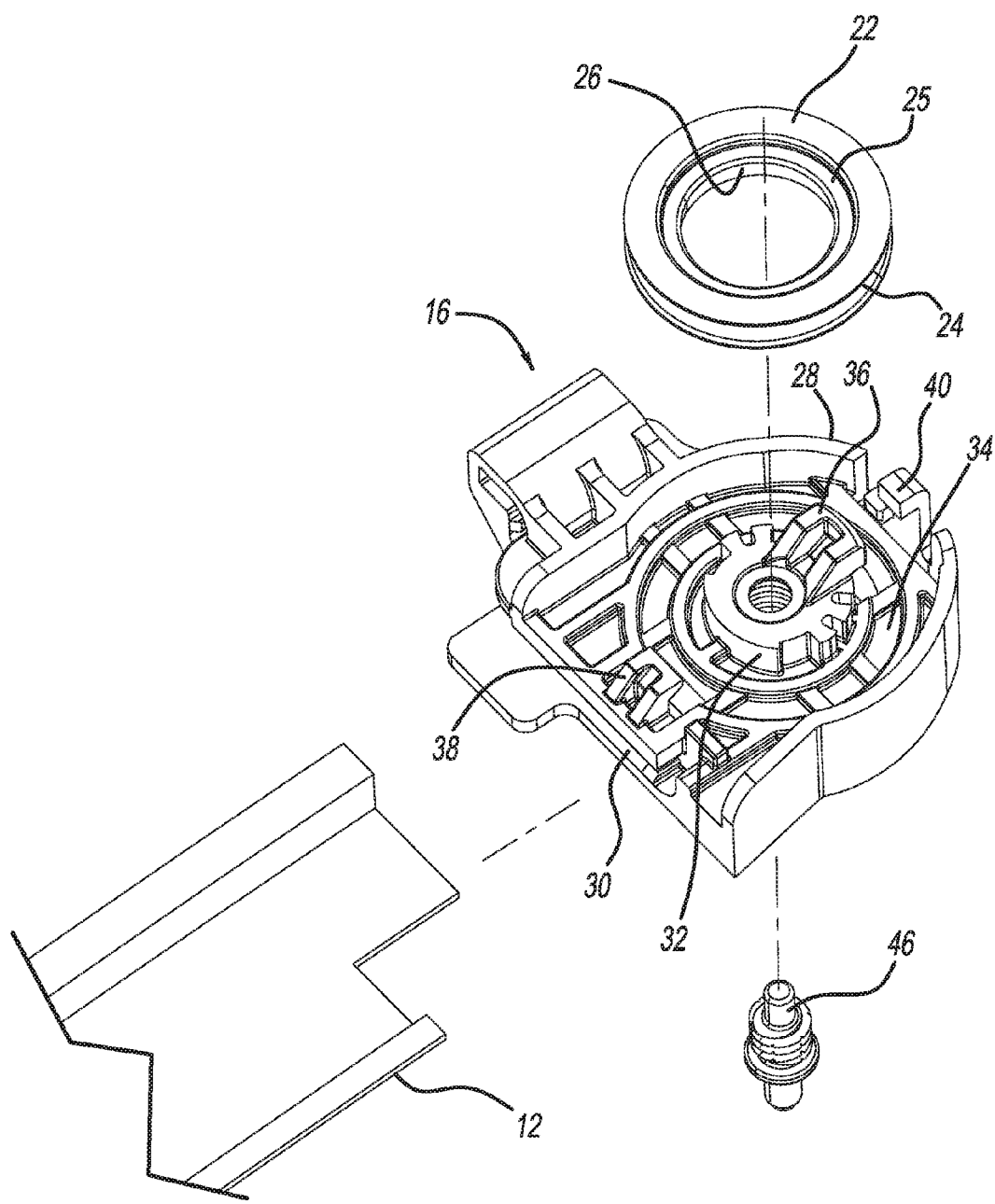
FIG. 2 is an exploded view of the pulley joint assembly components.
Figure 3A:
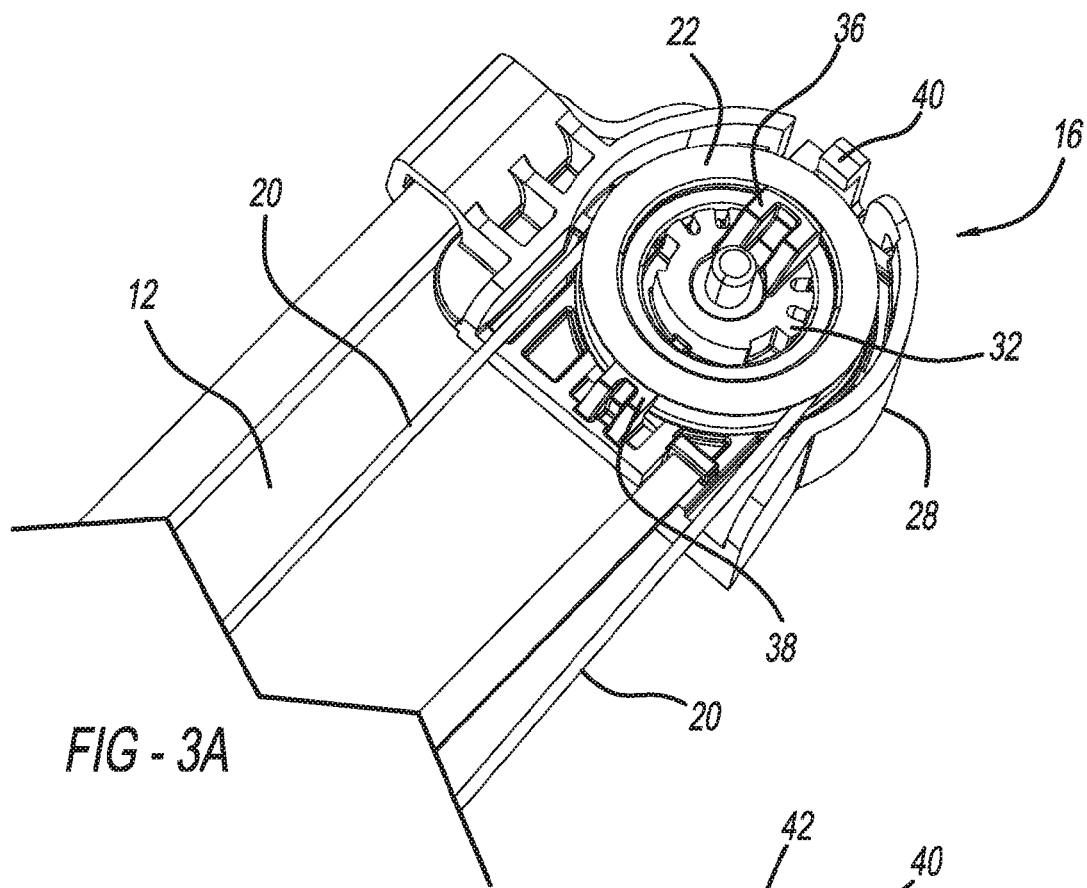
FIGS. 3A and 3B are enlarged illustrations of the pulley joint assembly.
Figure 3B:
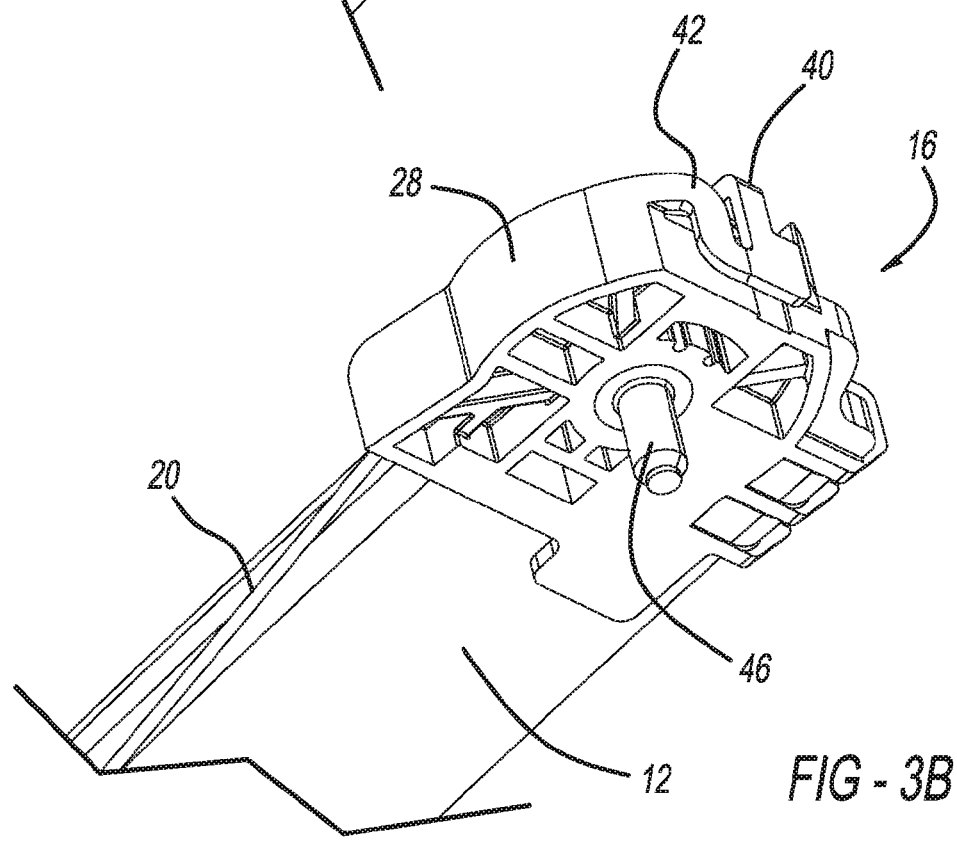

Pulley housing 28 is an injection molded unitary plastic component and features slot 30 to enable it to be slid on and attached to the upper end of guide rail 12, as best illustrated in FIG. 2. Once assembled, a locking feature may be implemented to maintain the components in an assembled condition. For example, a pierced hole or tab formed in guide rail 12 can be provided to interact with an interlocking feature of pulley housing 28, or a discrete fastener may be used for attachment of the components. Pulley housing 28 further integrally forms projecting bearing post 32 within a circular clearance area 34 provided for accommodating pulley ring 22 for rotation. Projecting from bearing post 32 is retention tab 36 which extends in a radially outward direction to overlie a portion of clearance area 34. Retention tab 38 is also provided which is positioned radially outside clearance area 34 and extends in a radially inward direction toward bearing post 32 and overlies clearance area 34. An additional tab 40 extends from is supported by flexible arm 42, and in a normal relaxed condition, positions tab 40 to project radially inwardly to overlie circular clearance area 34. In this illustrated embodiment, central clearance bore 44 is provided at the center of bearing post 32 and receives bolt 46 which is used to fasten the upper end of the unit to associated structure. Retention tabs 36 and 40 confront each other and are positioned along a radial line vertical with respect to the top of the assembly and tension applied by the drive pulley, and tab 38 is located at a diametrically opposed radial position from tabs 36 and 40.

Figure 4A:
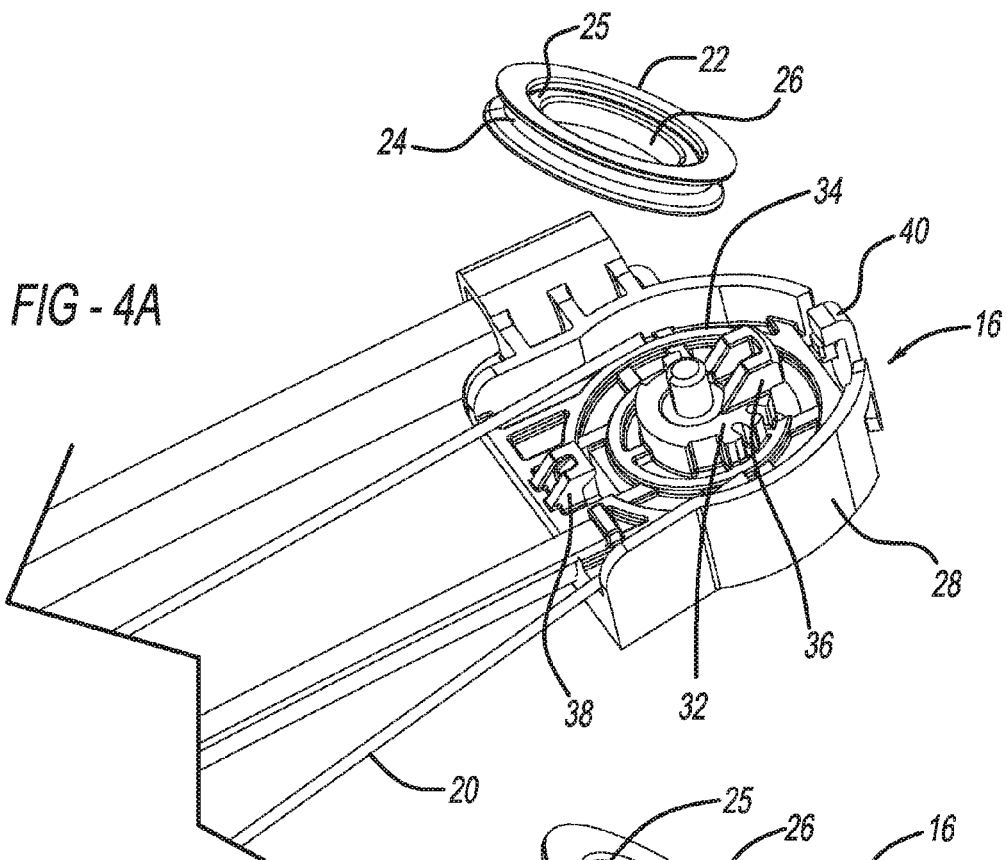
FIGS. 4A and 4B are pictorial views illustrating an assembly process of the pulley ring into the pulley joint housing.
Figure 4B:
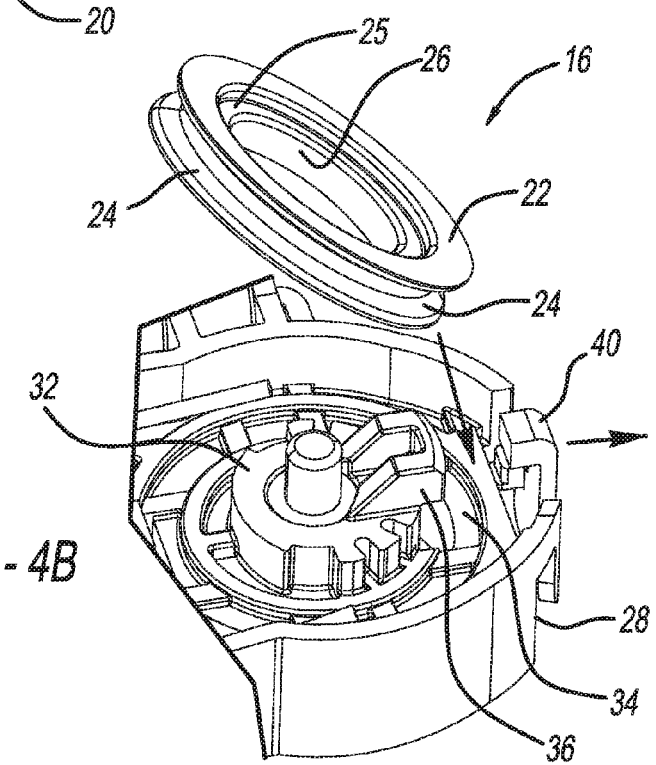
Figure 6:
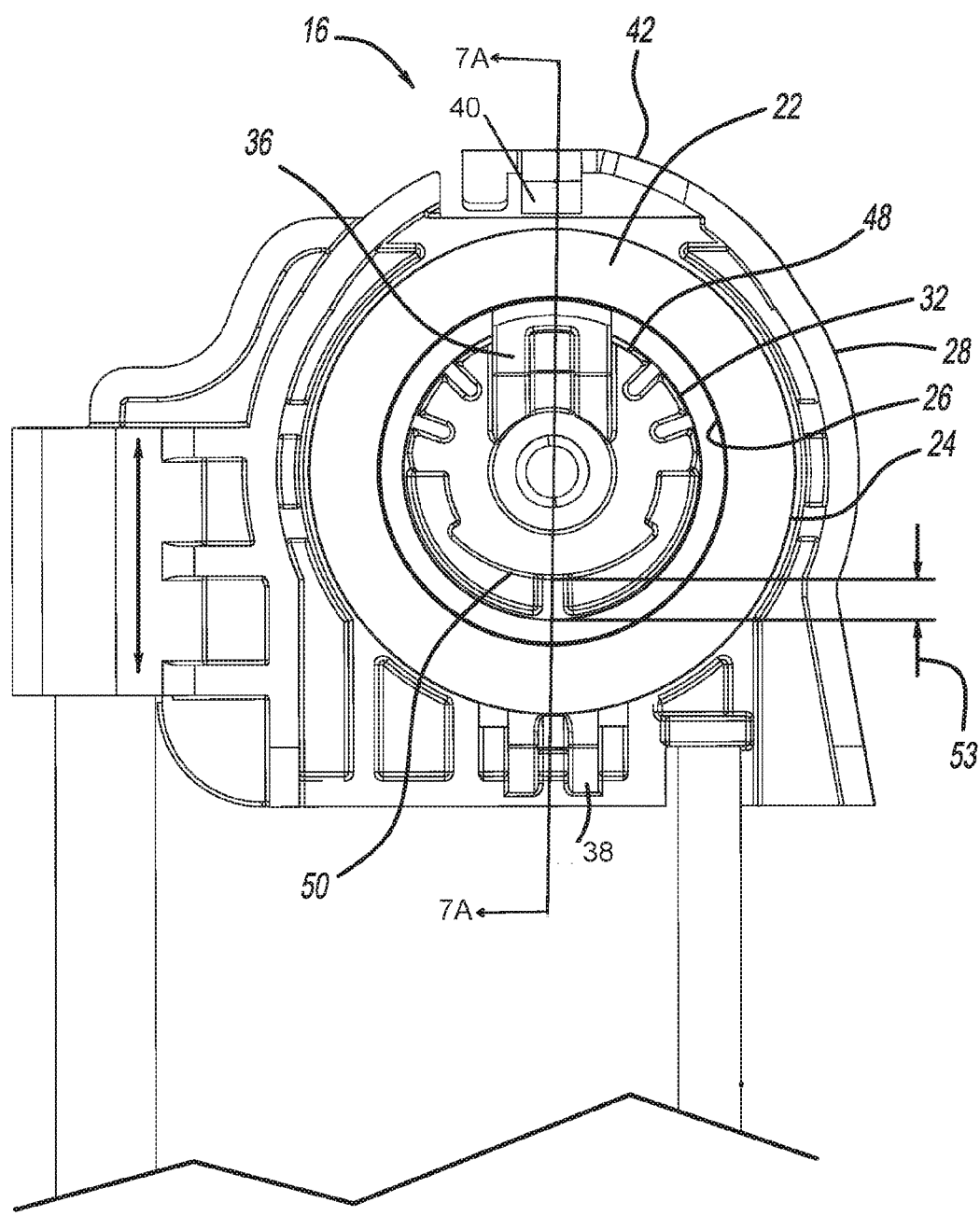
FIG. 6 is a top view of pulley assembly showing contact and clearance segments of the bearing post.

Now with reference to FIGS. 4A, 4B, 5A and 5B, additional design features and an assembly process for pulley assembly 16 is described. As shown in FIGS. 4A and 4B, in a first assembly step, pulley ring 22 is positioned over bearing post 32 and its upper edge is placed in the gap between tabs 36 and 40. As shown pulley ring 22 is tipped from the plane of its final installed position. Tab 40 is deflected as shown in FIG. 5A and this portion of the ring 22 is placed in position. Thereafter, the bottom edge of ring 22 closest to hook 38 can be displaced over tab 38 and placed into its final assembled condition. Arm 42 resiliently biases tab 40 to maintain pulley ring 22 in its installed condition, interlocked with tabs 36, 38 and 40 which overlie circular clearance area 34 and trap the pulley ring in position. Bearing post 32 is shaped such that an upper portion 48 makes direct contact with pulley ring bearing surface 26 over an arcuate contact surface when tension upon is applied by drive cable 20, whereas lower clearance segment 50 is provided to allow vertical displacement of pulley ring 22 during the installation process, as described previously. A clearance gap 53 shown in FIG. 6 allows pulley ring 22 to be displaced over retention tab 36 during installation. During operation of window regulator assembly 10, tension on drive cable 22 presses pulley ring 22 against the bearing portion of bearing post 32.

Assembly of pulley ring 22 and pulley housing 28 may occur before or after the assembly is affixed to guide rail 12. In the embodiment described above, bolt 46 is provided to support the upper end of regulator assembly 10 to an associated structure. However, bolt 46 is not provided to act as a bearing component for pulley ring 22. In an alternate design without bolt 46, the central area of pulley housing 28 can be solid, with other features provided for supporting window regulator assembly 10.

Figure 7A:
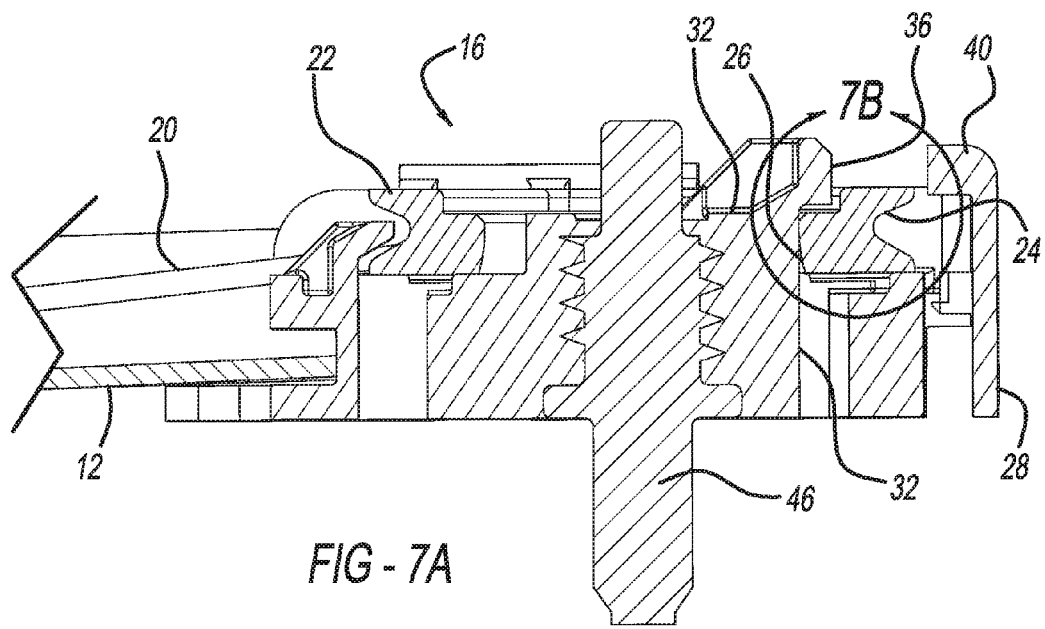
FIG. 7A is a cross-sectional view of the pulley joint assembly taken along line 7A-7A of FIG. 6
Figure 7B:
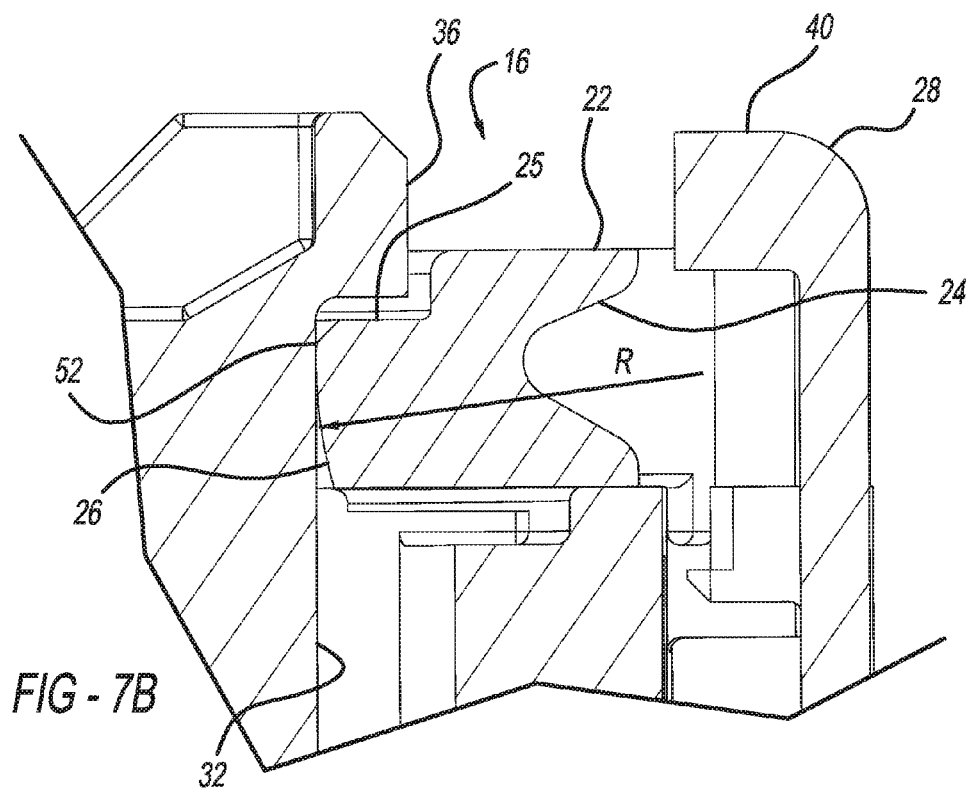
FIG. 7B is an elongated view taken from FIG. 7A.

FIGS. 7A and &B illustrate a feature for reducing friction in the sliding contact between pulley bearing surface 26 and bearing post 32. As shown by the figures, the bearing surface 26 may be relieved or chamfered from a cylindrical surface such that contact does not occur along its entire axial length but is rather concentrated to a line of contact 52. Reduction of the contact area may provide lower friction, allowing more free movement of pulley ring 22 during operation of the window regulator assembly 10.

FIGS. 8A and 8B illustrate an embodiment of window regulator assembly 52 in which pulley assembly 26 is integrated into a module plate 56 which provides for mounting of various hardware components or functional features of the regulator assembly 54. Such implementations may not require a discrete guide rail 12 and the features of pulley housing 28 may be molded into a larger module plate provided for the other functions described above. The regulator assembly shown in FIG. 8A has its motor drive assembly 18a at a central location with a pair of pulley assemblies 16a positioned at the top and bottom of the guide rail 12a, as an example of alternate implementations of pulley assembly 16. Pulley assemblies 16a are functionally identical to assembly 16 described previously. Guide rail element 12a can be molded as part of module plate 56, or can be made of a metal component attached to the module plate or molded in position. Pulley housing 28a may be separately formed and affixed to module plate 56, or its features can be directly molded as an integral feature of the module plate.

While the above description constitutes the preferred embodiment of the present invention, it will be appreciated that the invention is susceptible to modification, variation and change without departing from the proper scope and fair meaning of the accompanying claims.

The invention claimed is:

1. A pulley assembly for guiding a cable comprising,
a pulley ring having an outer perimeter surface and an inside generally cylindrical bearing surface,
a pulley housing forming a central projecting bearing post, and a circular clearance area provided for accommodating the pulley ring, the pulley housing further forming a first retention tab extending from the central bearing post and projecting in a radially outward direction to overlie a portion of the circular clearance area, a second retention tab extending in a radially inward direction to overlie a portion of the circular clearance area, at least one of the first and the second retention tab being resiliently mounted to permit deflection away from overlying the circular clearance area to permit installation of the pulley ring within the circular clearance area,
the bearing post having an arcuate bearing portion and an arcuate clearance segment, the arcuate clearance segment permitting displacement of the pulley ring within the circular clearance area during assembly of the pulley ring to the pulley housing, and
the pulley ring and the pulley housing cooperating to permit the pulley ring to be inserted into the circular clearance area upon deflection of at least one of the first and the second tabs and the first and the second tabs cooperating to trap the pulley ring within the circular clearance area in a fully assembled condition.

2. The pulley assembly in accordance with claim 1 further comprising; the pulley assembly integrated into an automotive vehicle window regulator assembly with the pulley ring guiding a cable for controlling motion of a vehicle closure panel, and wherein the arcuate bearing portion of the bearing post is located such that tension on the cable causes the pulley ring inside bearing surface to be pressed against the arcuate bearing portion.

3. The pulley assembly in accordance with claim 2 further comprising; the pulley housing mounted to a window regulator guide rail.

4. The pulley assembly in accordance with claim 1 further comprising; a third tab formed by the pulley housing extending in a radially inward direction from an outer perimeter edge of the circular clearance area and overlying the circular clearance area.

5. The pulley assembly in accordance with claim 1 further comprising the second tab being resiliently supported by an arm.

6. The pulley assembly in accordance with claim 1 further comprising; the pulley cylindrical inside surface having a tapered configuration to bear against the central bearing post along a line of contact.

7. The pulley assembly in accordance with claim 1 further comprising; wherein during installation of the pulley ring, the pulley ring is tipped from an installed position plane with a portion inserted between the first and the second tabs, and is then rotated to place the pulley ring in the fully assembled condition.

8. The pulley assembly in accordance with claim 1 further comprising; wherein the pulley housing is integrated into a module plate.

9. The pulley assembly in accordance with claim 1 wherein the pulley assembly is integrated into a window regulator assembly with the pulley assembly mounted to an end of a guide rail.

10. The pulley assembly in accordance with claim 1 further comprising the pulley assembly integrated into an automotive vehicle window regulator assembly with the pulley ring guiding a cable for controlling motion of a vehicle closure panel, the pulley housing mounted to a window regulator guide rail, the first and the second retention tabs oriented to face each other in a first radial position, with a third retention tab extending radially inwardly at a second radial position diametrically opposed from the first radial position and the second retention tab being resiliently mounted.

* * * * *